J. A. PERKINS.
ROLLER BEARING.
APPLICATION FILED DEC. 10, 1912. RENEWED JUNE 9, 1916.
1,212,550.
Patented Jan. 16, 1917.
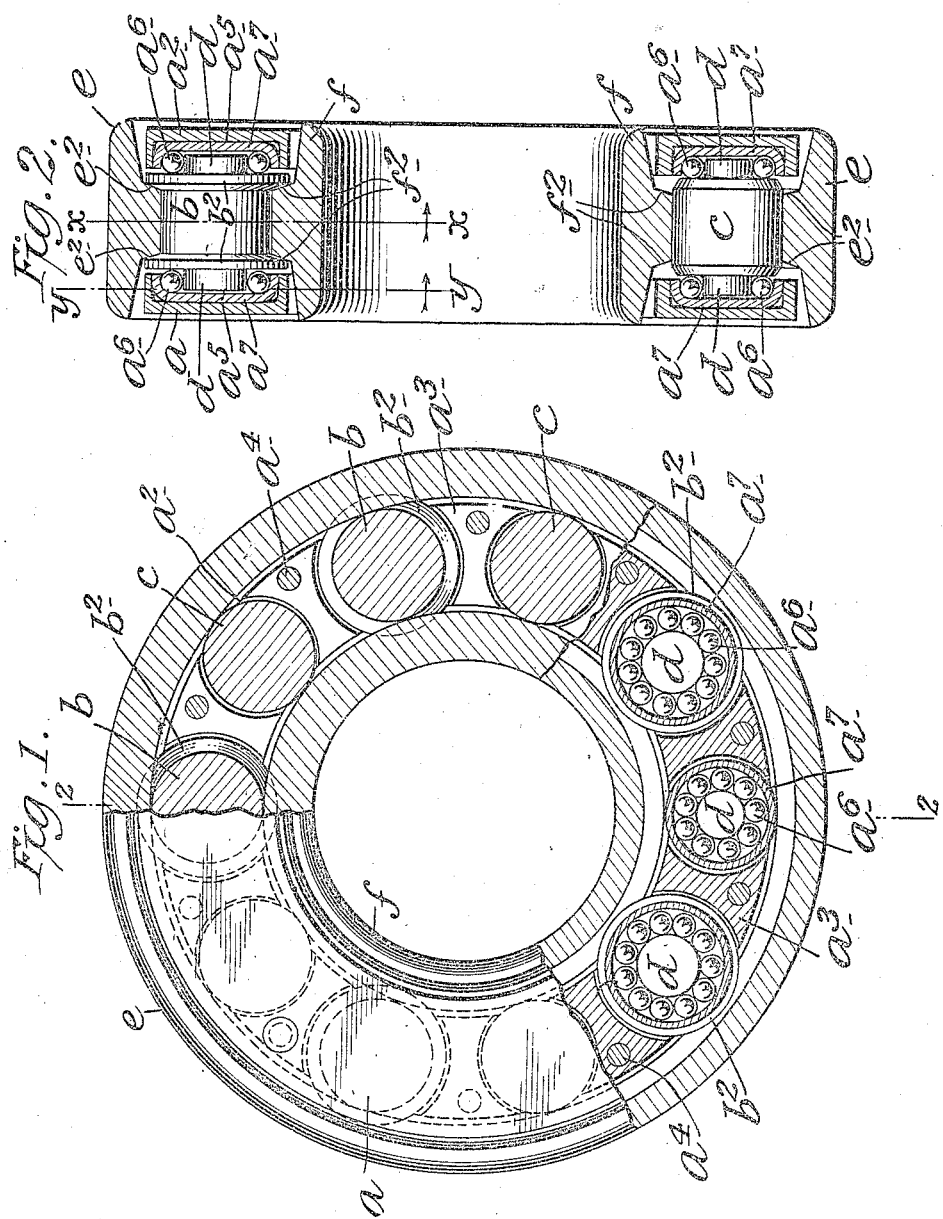

UNITED STATES PATENT OFFICE.

JULIUS AUGUSTUS PERKINS, OF OMAHA, NEBRASKA.

ROLLER-BEARING.

1,212,550.   Specification of Letters Patent.   Patented Jan. 16, 1917.

Application filed December 10, 1912, Serial No. 735,901. Renewed June 9, 1916. Serial No. 102,797.

*To all whom it may concern:*

Be it known that I, JULIUS A. PERKINS, a citizen of the United States of America, and residing at Omaha, in the county of Douglas and State of Nebraska, have invented certain new and useful Improvements in Roller-Bearings, of which the following is a specification, such as will enable those skilled in the art to which it appertains to make and use the same.

The object of this invention is to provide a self-contained bearing adapted to take both radial and end-thrust loads upon rollers, as distinguished from bearings in which balls are used to take both such loads, and also from those employing conical rollers adapted primarily to take radial load but being also subjected to end-thrust load, both of which forms have been found to be very short-lived.

This invention is distinguished over a copending application in the fact that I provide two beveled flanges on the rollers of the present form, preferably at or adjacent the roller ends, and adapted to take the end-thrust in either direction without reducing the effective radial load capacity of the rollers.

The present form is still further distinguished by the fact that I employ solid bearing members instead of the built-up members shown in the said application.

A still further distinguishing feature resides in the fact that my present bearings are open at the ends and thus permit ready egress of any metal cuttings due to excessive end-thrust load, as well as to any foreign or other deleterious matter which might be in or reach the bearings; and a still further difference is that I only flange one half of the rollers in the present form, thus obtaining more radial load capacity because of the rollers not flanged and without loss of end-thrust load capacity for the reason that I employ the same number of flanges in the bearing as a whole and, in the present form, the pintles on the flanged rollers are considerably larger in diameter than those of the unflanged rollers, thus enabling me to employ two more balls for each pintle of the flanged rollers which materially aid in maintaining the alinement thereof.

My invention is fully set forth in the following specification, of which the accompanying drawings form a part, in which the separate parts are designated by the same reference characters in each of the views, and in which:—

Figure 1 is an end view of a bearing constructed in accordance with my present invention, being partly in exterior elevation, partly in section on the line $x$—$x$ and partly on the line $y$—$y$ of Fig. 2; and Fig. 2 is a section taken on the line 2—2 of Fig. 1.

In the drawings forming a part of this application I have shown a cage comprising end-plates $a$ and $a^2$ joined by ribs $a^3$, said plates and ribs being locked together by means of rivets $a^4$ or suitable equivalent, and each of said end-plates is recessed, as shown at $a^5$, for the reception of anti-friction means $a^6$, hardened cups $a^7$ being preferably interposed between said means and end-plates for the reason that it is impracticable to harden the latter in the desired positions.

The balls $a^6$ are interposed between the cups $a^7$ and rollers $b$ and $c$, two distinct types of which are employed in the form of embodiment shown for reasons later explained, and all of the rollers are provided with pintles $d$ about which the corresponding series of balls are arranged in such manner as to take, anti-frictionally, any tendency of the rollers to move or be moved out of alinement as, for instance, by the end-thrust of the shaft or wheel when my bearings are used in automobile wheels and, while the radial load supporting portions of the rollers are of the same diameter, it will be seen that the rollers $b$ are each provided with outwardly beveled flanges $b^2$ at the ends thereof, or approximately so.

In order to utilize my bearings within the limited spaces met with, as substitutes for conventional ball bearings, I provide outer and inner bearing members, $e$ and $f$ respectively, and which, together with the cage of rollers, form a unit for ease of assembling, transportation, or handling, such units, because of their being factory assembled, avoiding any possibility of faulty assembling in a wheel or the like, or of derangement of the parts, by careless or unskilled persons.

The bearing member $e$ is provided with a centrally arranged, inwardly directed, cylindrical portion forming shoulders $e^2$, preferably inclined in the same degree as the beveling of the roller flanges $b^2$, whereby a line contact results therebetween for taking the end-thrust, and the bearing member $f$ is similarly provided with an outwardly directed, cylindrical, portion having shoulders $f^2$ of the same inclination as the flanges $b^2$, these members being preferably of a single piece each, and it will be seen that the end-thrust is taken by the flanges at one end of the rollers, on the inner beveled faces thereof, through the rollers, and by the inner beveled faces of the flanges at the opposite roller ends, from the shoulders $e^2$ or $f^2$ diagonally from the member $e$ to the member $f$, or reversely, in either direction.

As clearly shown, the rollers $b$ and $c$ are alternately arranged, the latter greatly increasing the radial load capacity of the bearing over that possible to the number of rollers $b$ shown, and said rollers $c$ are necessary to the assembling of the present bearing when solid bearing members $e$ and $f$ are used, said assembling being accomplished by placing the member $f$ within the member $e$ in the position of the greatest eccentricity or, in other words, by having the members approximately touch each other, in which positions a space is provided therebetween for the passage of the flanges $b^2$ of the rollers $b$ and, when these rollers are in position between the members, they may be spaced by being moved about the inner member which thereby assumes a position of concentricity with respect to the member $e$. The rollers $b$ are then arranged in their respective cups $a^7$ of one of the cage end-plates, after which the rollers $c$ are arranged between the rollers $b$, the other end-plate placed in position and the cage rivets or other securing means being then employed to lock the cage elements together, thus locking the bearing members $e$ and $f$ in position as well, and my bearing, as a unit, is ready for handling, shipment, or installation, without danger of displacement of any of the parts.

It will thus be seen that I provide a bearing in which a "line" contact is insured for both the radial and end-thrust loads, as distinguished from the "point" contact of a ball bearing, and the very destructive friction in a conical roller bearing taking both loads is avoided, thus insuring a bearing, for combined radial and end-thrust loads, of high efficiency and of great permanence and durability, and any tendency of the rollers to get out of alinement is prevented anti-frictionally, thus also insuring the bearing against wear.

Having fully described my invention, what I claim as new, and desire to secure by Letters Patent, is:—

1. A bearing, comprising an outer solid ring having a centrally arranged, inwardly directed, member presenting a cylindrical bearing surface, an inner solid ring having a centrally arranged, outwardly directed, member presenting a cylindrical bearing surface, a plurality of cylindrical rollers operating on said bearing surfaces and provided, each, with end flanges of greater diameter than said rollers impinging on corresponding edges of said members to take end thrust, a plurality of unflanged rollers, and means for guiding said rollers.

2. A bearing, comprising an outer solid ring having an inwardly directed member presenting a cylindrical bearing surface, an inner solid ring having an outwardly directed member presenting a cylindrical bearing surface, a plurality of rollers operating on said surfaces and provided, each, with end flanges of greater diameter than said rollers impinging on corresponding edges of said members, said member edges and the inner surfaces of said flanges being similarly inclined, a plurality of unflanged rollers, and means for guiding all of said rollers.

3. A bearing, comprising an outer solid ring having an inwardly directed member presenting a cylindrical bearing surface, an inner solid ring having an outwardly directed member presenting a cylindrical bearing surface, said rings being outwardly flared from said members to permit the escape of foreign matter, a plurality of rollers operating on said surfaces and provided, each, with end flanges impinging on corresponding edges of said members to take end thrust, a plurality of unflanged rollers, and means for guiding said rollers.

In testimony that I claim the foregoing as my invention I have signed my name in presence of the subscribing witnesses this 5th day of December 1912.

JULIUS AUGUSTUS PERKINS.

Witnesses:
F. ELLIS BROWNE,
H. C. KOPP.